(12) United States Patent
Yi

(10) Patent No.: US 7,882,532 B2
(45) Date of Patent: *Feb. 1, 2011

(54) SYSTEM AND METHOD FOR MULTIPLEXING MEDIA INFORMATION OVER A NETWORK WITH REDUCED COMMUNICATIONS RESOURCES USING PRIOR KNOWLEDGE/EXPERIENCE OF A CALLED OR CALLING PARTY

(75) Inventor: Byung K. Yi, San Diego, CA (US)

(73) Assignee: LG Electronics Inc., Seoul (KR)

( * ) Notice: Subject to any disclaimer, the term of this patent is extended or adjusted under 35 U.S.C. 154(b) by 1275 days.

This patent is subject to a terminal disclaimer.

(21) Appl. No.: 10/663,776

(22) Filed: Sep. 17, 2003

(65) Prior Publication Data

US 2004/0060067 A1    Mar. 25, 2004

Related U.S. Application Data

(62) Division of application No. 10/252,412, filed on Sep. 24, 2002, now Pat. No. 7,003,040.

(51) Int. Cl.
*H04N 7/173* (2006.01)
*H04N 7/12* (2006.01)
*H04B 1/66* (2006.01)

(52) U.S. Cl. ........................ 725/105; 375/240
(58) Field of Classification Search ............... None
See application file for complete search history.

(56) References Cited

U.S. PATENT DOCUMENTS

| 5,784,001 | A |   | 7/1998 | Deluca et al. | 340/825.44 |
| 5,870,683 | A |   | 2/1999 | Wells et al. | 455/566 |
| 5,907,604 | A | * | 5/1999 | Hsu | 379/142.06 |
| 6,020,828 | A |   | 2/2000 | Gotou | 340/825.44 |
| 6,044,248 | A |   | 3/2000 | Mochizuki et al. | 455/38.4 |
| 6,084,951 | A |   | 7/2000 | Smith et al. | 379/93.17 |
| 6,111,863 | A |   | 8/2000 | Rostoker et al. |  |
| 6,118,824 | A |   | 9/2000 | Smith et al. |  |
| 6,181,954 | B1 |   | 1/2001 | Monroe et al. | 455/557 |
| 6,205,128 | B1 | * | 3/2001 | Le | 370/331 |
| 6,226,367 | B1 |   | 5/2001 | Smith et al. | 379/142 |
| 6,226,512 | B1 |   | 5/2001 | Macaulay et al. | 455/414 |

(Continued)

FOREIGN PATENT DOCUMENTS

CN    1292615    4/2001

(Continued)

*Primary Examiner*—Nhon T Diep
(74) *Attorney, Agent, or Firm*—Lee, Hong, Degerman, Kang & Waimey

(57) ABSTRACT

A system and method for managing communication in an integrated services network ensures that media information is displayed on at least one of two terminals during a call without using any transmission bandwidth. This is achieved by having at least one of the terminals pre-store the media information in a memory and then controlling the terminal to recall and display this information when certain events occur during the call. The media information may include animated information, images, and short-time video scripts. This information and broader band media such as streaming video may be displayed on the same terminal. The display of media information may also be controlled based on the past knowledge and experience callers have about one another and/or their communications equipment.

9 Claims, 8 Drawing Sheets

U.S. PATENT DOCUMENTS

| | | | |
|---|---|---|---|
| 6,239,787 B1 | 5/2001 | Sugaya | 345/169 |
| 6,307,836 B1 * | 10/2001 | Jones et al. | 370/230 |
| 6,314,302 B1 | 11/2001 | Haferbeck et al. | 455/550 |
| 6,335,753 B1 | 1/2002 | McDonald | 348/14 |
| 6,343,120 B1 | 1/2002 | Rhodes | 379/142 |
| 6,424,369 B1 | 7/2002 | Adair et al. | 348/76 |
| 6,452,915 B1 | 9/2002 | Jorgensen | |
| 6,453,294 B1 | 9/2002 | Dutta et al. | 704/270.1 |
| 6,473,631 B1 | 10/2002 | Siddoway et al. | 455/575 |
| 6,622,004 B1 | 9/2003 | Sonoda et al. | |
| 6,675,384 B1 | 1/2004 | Block et al. | |
| 6,793,619 B1 | 9/2004 | Blumental | |
| 6,798,872 B1 | 9/2004 | Matsumoto et al. | |
| 7,130,282 B2 * | 10/2006 | Black | 370/296 |
| 2001/0026562 A1 | 10/2001 | Fujita | |
| 2001/0041578 A1 | 11/2001 | Na | |
| 2002/0069067 A1 | 6/2002 | Klinefelter et al. | |
| 2002/0090068 A1 | 7/2002 | Song | |
| 2002/0137544 A1 | 9/2002 | Myojo | |
| 2002/0151325 A1 | 10/2002 | Fitton et al. | |
| 2002/0186668 A1 | 12/2002 | Thomason | |
| 2003/0056220 A1 | 3/2003 | Thornton et al. | |
| 2003/0100295 A1 | 5/2003 | Sakai et al. | |
| 2003/0109219 A1 | 6/2003 | Amselem | |
| 2003/0112821 A1 | 6/2003 | Cleveland et al. | |
| 2003/0142648 A1 | 7/2003 | Semper | |
| 2003/0156218 A1 | 8/2003 | Laksono | |
| 2003/0224830 A1 | 12/2003 | Zhang et al. | |
| 2004/0029526 A1 * | 2/2004 | Miki et al. | 455/11.1 |
| 2004/0047297 A1 | 3/2004 | Wynn | |
| 2004/0047461 A1 | 3/2004 | Weisman et al. | |
| 2005/0111645 A1 | 5/2005 | Aoyama et al. | |

FOREIGN PATENT DOCUMENTS

| | | |
|---|---|---|
| CN | 1298272 A | 6/2001 |
| EP | 1228610 | 8/2002 |
| JP | 2002-044285 | 2/2002 |
| KR | 10-2000-0064041 | 11/2000 |
| KR | 10-2001-0049041 | 6/2001 |
| KR | 1020010046956 | 6/2001 |
| KR | 1020010049041 | 6/2001 |
| KR | 10-2001-0058785 | 7/2001 |
| KR | 10-2002-0046671 | 6/2002 |
| KR | 1020020060489 | 7/2002 |
| RU | 2110162 | 4/1998 |
| WO | WO 98/007787 | 2/1998 |
| WO | WO 98/19438 A1 | 5/1998 |
| WO | WO 00/64110 | 10/2000 |
| WO | WO01/33781 | 5/2001 |
| WO | WO 01/33781 A1 | 5/2001 |

* cited by examiner

SYSTEM AND METHOD FOR MULTIPLEXING MEDIA INFORMATION OVER A NETWORK WITH REDUCED COMMUNICATIONS RESOURCES USING PRIOR KNOWLEDGE/EXPERIENCE OF A CALLED OR CALLING PARTY

CROSS-REFERENCE TO RELATED APPLICATIONS

This application is a divisional application of application Ser. No. 10/252,412, filed on Sep. 24, 2002, now U.S. Pat. No. 7,003,040, the contents of which is hereby incorporated by reference herein in its entirety.

BACKGROUND OF THE INVENTION

1. Field of the Invention

This invention generally relates to managing network communications, and more particularly to a system and method for controlling the communication of media information over an integrated services network.

2. Background of the Related Art

In recent years, remarkable technical advances have been made in the areas of wireless- and Internet-related communications. One application of this technology focuses on providing bi-directional video conferencing (e.g., video phone) services over wired and wireless networks. In order to provide real-time streaming video of reasonable quality, a transmission bandwidth of at least 64 K bits per second is required. This is approximately eight times the bandwidth required for voice communications, even if a highly efficient compression scheme is implemented.

One of the most significant stumbling blocks to providing high-quality multimedia video-conferencing services is insufficient transmission bandwidth. Also, there is great doubt as to whether two-way video phone services will be of interest to the public, even if these services can be provided at a reasonably affordable price. To elicit public interest and therefore to build a strong market for the video conferencing industry, the Inventor of the present invention has realized that social interactions between callers must be encouraged without sacrificing valuable transmission bandwidth. Taking this approach will likely increase minutes of usage and thus generate revenue sufficient to ensure the continued advancement of the telecommunications industry.

The Inventor of the present invention has also recognized that next-generation communications systems must provide a variety of multimedia services including real-time streaming video and video-clip swapping, while simultaneously conserving or reducing transmission bandwidth requirements and other network resources. Present communications systems do note adequately provide these services, and the services they do provide are implemented in an efficient manner. A need therefore exists for a system and method for providing enhanced multimedia services to the public which at the same time conserves or reduces network resources.

Further, it is noted that currently existing telecommunications systems cannot deal with abstractions and emotions of callers that are natural to every day interaction. For example, the majority of callers know one another. They know their characters, physical appearances, and other attributes through past shared experiences and knowledge. Parties also often have knowledge of other parties' mobile terminals, including the manner in which they are equipped and their ability to support multimedia and other services. Existing communications systems do not use the prior knowledge and experience of callers as a basis for reducing transmission bandwidth in providing multimedia services in a communications system. These systems also do not use prior knowledge and experience as a basis for reducing the costs associated with providing multimedia communications.

Further, it is noted that conventional communications systems are required to transmit multimedia information over a network every time these services are desired to be displayed on a receiving terminal. This frustrates attempts to conserve transmission bandwidth and adversely affects the quality of communications of other users.

There is, therefore, an additional need for a system and method that manages communication of multimedia services more efficiently than conventional systems, by ensuring that transmission bandwidth and other network resources are not used every time one terminal desires another terminal to display media information. There is also a need to provide a system and method of this type in a cost-effective manner.

SUMMARY OF THE INVENTION

An object of the invention is to solve at least the above problems and/or disadvantages and to provide at least the advantages described hereinafter.

It is one object of the present invention to provide a system and method for managing communication of media information in a network more efficiently than conventional systems of this type.

It is another object of the present invention to achieve the aforementioned object by ensuring that transmission bandwidth and other network resources are not used every time one terminal desired another terminal to display media information.

It is another object of the present invention to achieve the aforementioned objects in a cost-effective manner.

It is another object of the present invention to provide a system and method for managing communication of media information in a network using fewer network resources (including transmission bandwidth) than conventional systems, while simultaneously providing an equal or greater array of multimedia services to customers.

It is another object of the present invention to provide a system and method which allows a user at one terminal to control the display of multimedia information based on an identity of a party at another terminal.

It is an object of the present invention to provide a system and method which manages the communication of media information in a network based on prior knowledge and experience callers have with one another, and more specifically to use this prior knowledge and experience as a basis for reducing transmission bandwidth in providing multimedia services within a network without sacrificing the quality of those services.

The foregoing and other objects of the invention are achieved by providing, in one respect, a highly compressed pseudo-video system which manages the transmission and display of media information in an integrated services network using fewer network resources than conventional systems. The network may be a wireless network or the Internet, and the media information may include real-time video streams, short-time video scripts, images (e.g., snapshots), live animations, and still animations.

In accordance with one embodiment, the invention reduces transmission bandwidth by having animation, image, and/or short-time video script information pre-stored in memories located within or attached to the communicating terminals.

Instead of transmitting this media information over the network, the receiving terminal may therefore automatically retrieve and display the pre-stored media information in response to receiving a call from another user or other events that may transpire during a call.

In accordance with another embodiment, the invention reduces transmission bandwidth by combining and transmitting high-bandwidth media such as streaming video and short-time video scripts to a receiving terminal, and then coordinating the display of that high-bandwidth media with lower-bandwidth media. Since the lower-bandwidth media is pre-stored in the receiving terminal, no transmission bandwidth is expended in order to be display the lower-bandwidth media on the receiving terminal.

The present invention also allows for a shifting in the telecommunication paradigm. In conventional systems, every communication link relies on the following assumption: communications links are established is independently from prior knowledge and experience of the communicating parties. Conventional systems, thus, strictly allocate network resources based on communication protocols. The abstractions, imaginations, and emotions of callers are never taken into consideration.

The present invention takes the abstractions, imaginations, and emotions of the callers as well as their past knowledge and experience with one another into consideration when managing the communication and display of media information on user terminals. For example, using prior knowledge and experience, the communicating patties can control the amount of information they want to transmit based on how much they are willing to pay for various communication services.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The present invention is a system and method for controlling communication of media information between two terminals in a network. In one respect, the invention controls the manner in which different types of media information are multiplexed and transmitted between the terminals. In another respect, the invention controls the manner in which media information is displayed or otherwise output on the terminals. This control may be performed based on past experience/knowledge one user may have about the other, or based on a service option selected by one or both of the users. The invention thus may be customized to meet the specific desires of each user. Advantageously, the invention may also be implemented to reduce network resources (including the transmission bandwidth) that conventional methods would requite in order to send media information between terminals.

Figure 1:
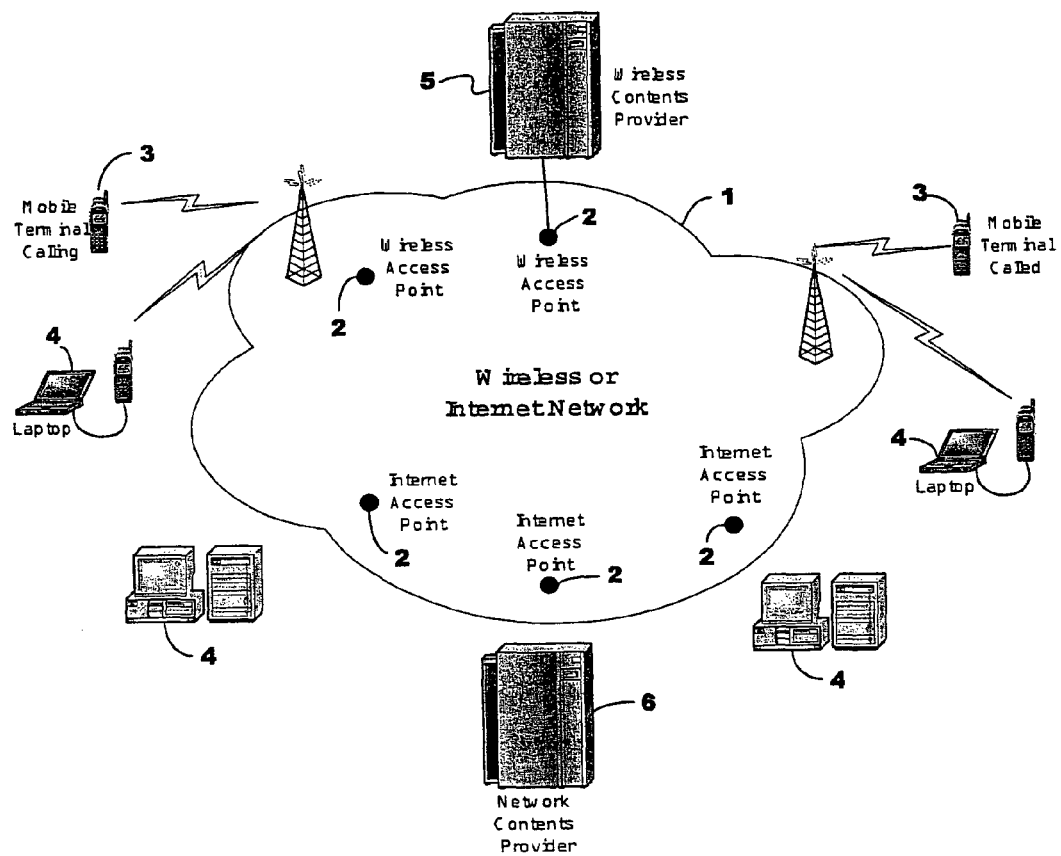
FIG. 1 is a diagram showing an example of a communications system in which the present invention may be implemented.

FIG. 1 shows an example of a communications system in which the present invention may be implemented. The communications system includes a network 1 for receiving and transmitting calls within a predetermined geographic area. The network may be a wired or wireless network operating in accordance with any one of a variety of communications standards. To maximize customer subscriptions, a wired-version of the network may be implemented as a wide-area such as the Internet. Preferably, the network is integrated to include a plurality of access points or gateways 2 for connecting terminals through different networks. These terminals include mobile terminals 3 such as mobile telephones, so-called web phones, personal digital assistants (PDAs), and pocket computers to name a few. The network may also connect desktop or notebook personal computers 4 either to each other or to the mobile terminals. Wireless content providers 5 and/or network content providers 6 may be included as desired.

Figure 2:
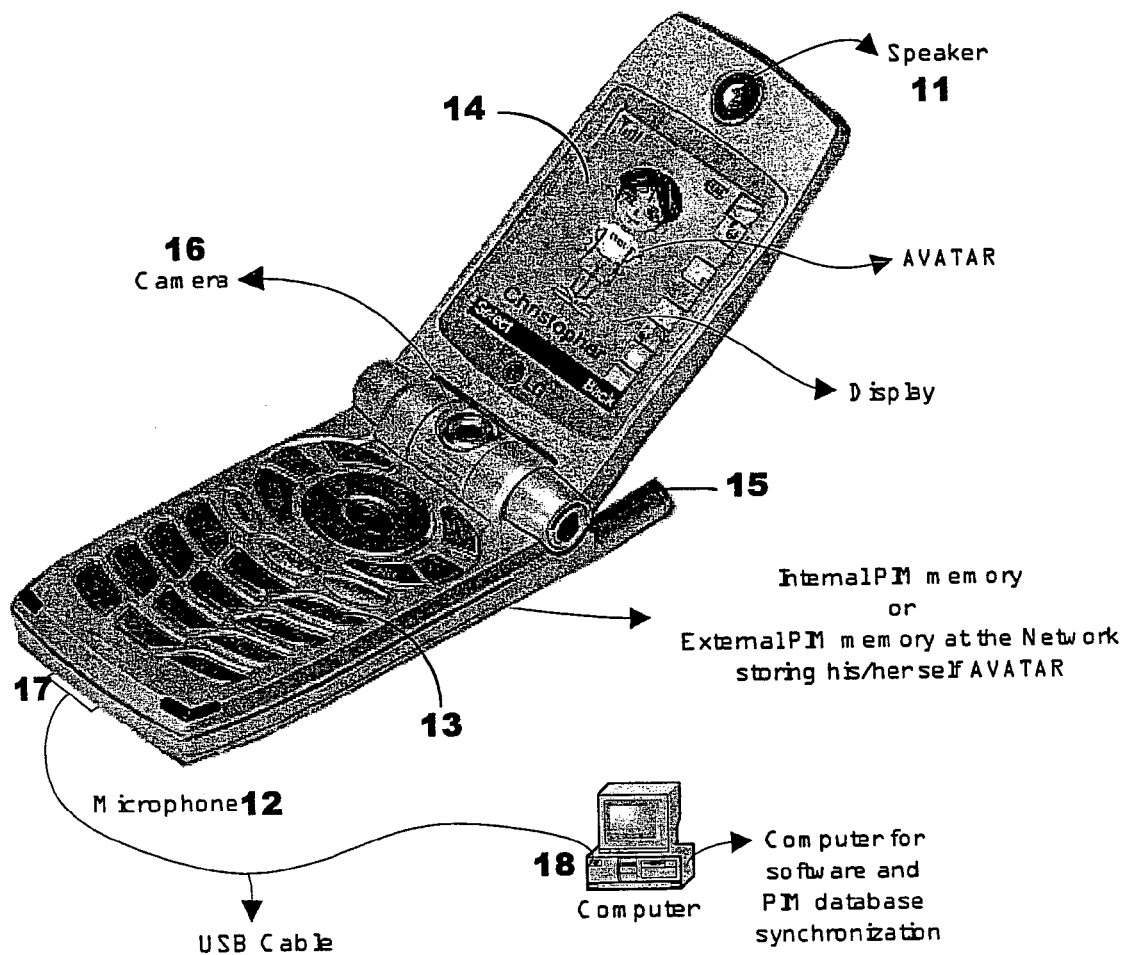
FIG. 2 is a diagram showing a mobile terminal which may be configured to operate in accordance with the present invention.

FIG. 2 shows a mobile terminal 10 which may be configured to operate in accordance with the present invention. This terminal includes a speaker 11, a microphone 12, a keypad 13, and a display 14 for displaying media information which has either been pre-stored in a memory of the terminal or transmitted to the terminal through antenna 15, or both. The mobile terminal also includes as an optional feature a camera 16 which has the ability of capturing still images and/or acquiring real-time streaming video in a manner similar to a video phone or video-conferencing terminal. An external data port 17 such as a USB port may also be included for receiving and/or downloading information including media information from another system 18 such as a personal computer. While the mobile terminal shown in FIG. 2 is preferable for use with the present invention, those skilled in the art can appreciate that other type of terminals may be used provided they have the ability to output media information in a manner which will now be described.

Figure 3:
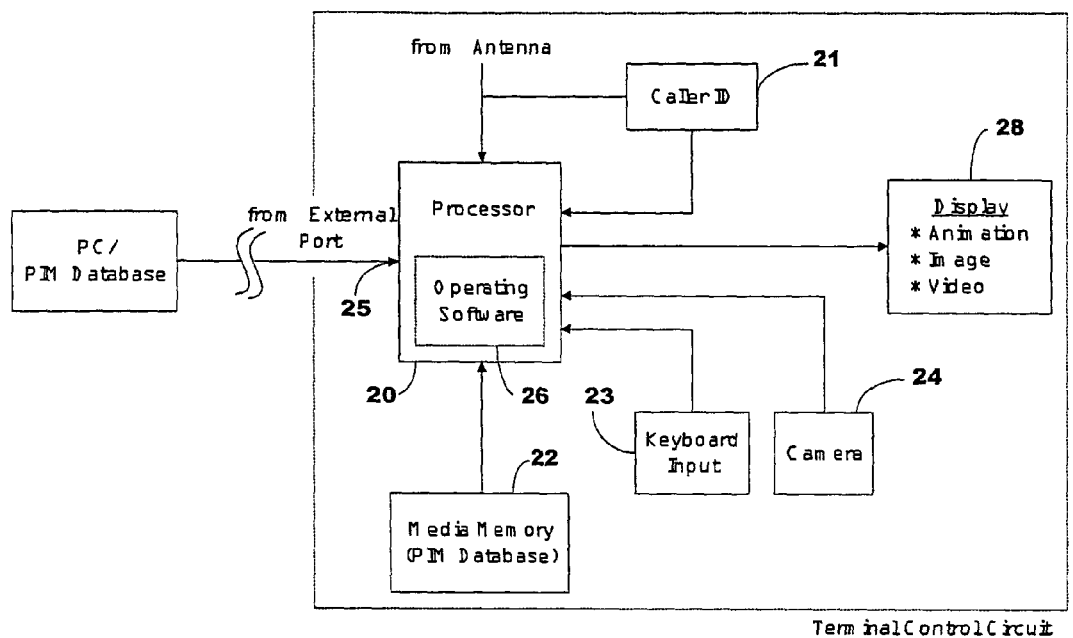
FIG. 3 is a diagram showing an example of a control circuit which may be used to display media information on a wireless terminal configured in accordance with the present invention.

FIG. 3 shows an example of a control circuit which may be used to display media information on a wireless terminal configured in accordance with the present invention. This control circuit includes a processor 20 connected to the antenna (not shown), an optional caller ID unit 21, a memory 22, a keyboard 23, a camera 24, and a data port 25. The caller ID unit extracts identification information from a call indicating an identity of a caller. This information may include the caller's telephone number, name, address, etc.

The memory may include an area for storing media information which may either be displayed on the terminal itself or transmitted for display on another terminal. The media information may be pre-stored in the terminal memory or received from another terminal for display. To control the display of media information, the memory may include an on-board personal information management (PIM) database. This database may operate based on information derived from the caller ID unit, control information input by a user, information downloaded to the terminal from an external computing system, or any combination thereof. If desired, the PIM database may be located in a personal computer or other external computing device which interfaces to the terminal through the data port. The data port may also be used to load media information into the memory of the terminal for subsequent transmission or display.

The processor of the terminal may also be used to combine, or multiplex, media data for transmission through its antenna. This media information may be stored in the on-board memory, imported from the external computing system, or both.

Prior to receiving a call, a user may set the parameters of operating software 26 in the processor for controlling, inter alia, the manner media information is to be displayed on the terminal. The user may also designate one or more media service options he or she would like to receive. These options may control the type of media information to be received in order to reduce service charges or, if cost is not an issue, enhance terminal operation to receive and display broadband media. Service options may be negotiated with the carrier directly or set by inputting information using the keyboard terminal.

When a call connection is established, the processor displays media information based, for example, on the control parameters and/or service options designated by the user. This media information may be stored in memory 22, received from a transmitting terminal on display 28, or both. The manner in which media information is communicated between terminals for display will now be discussed.

Figure 4:
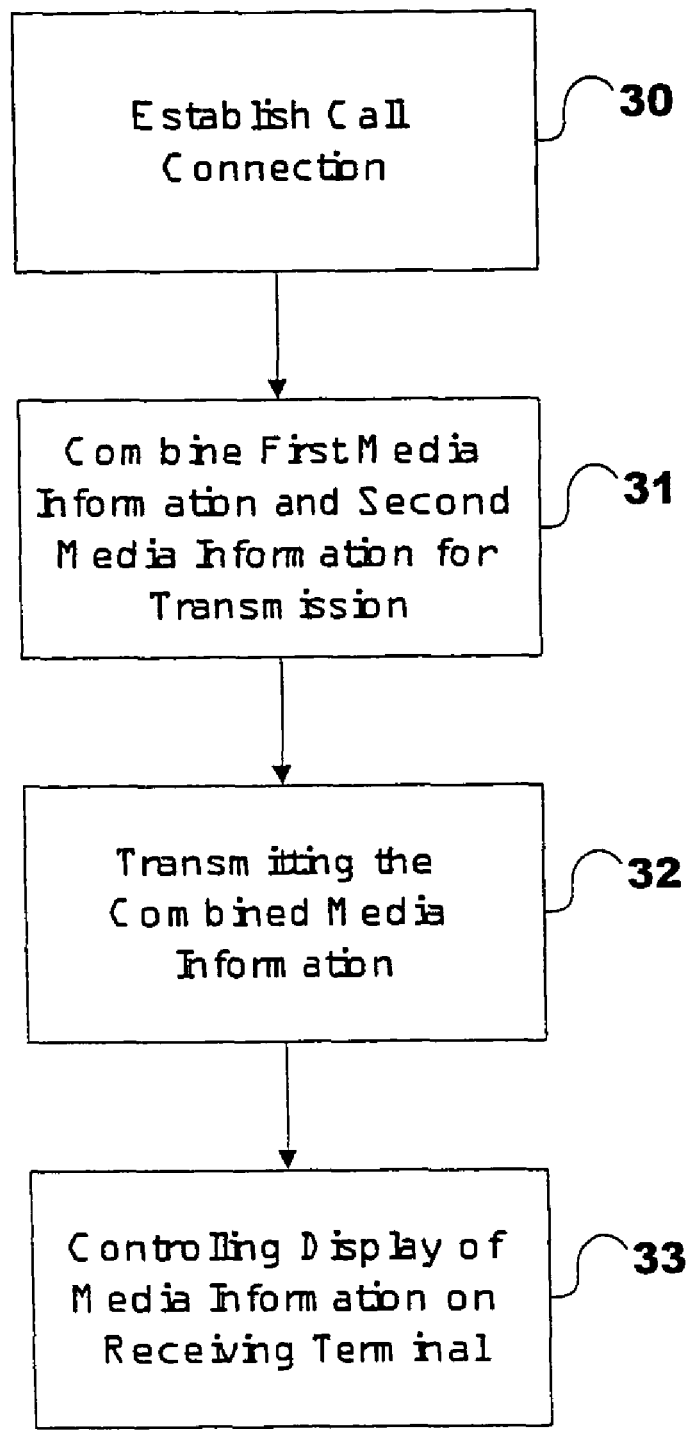
FIG. 4 is a flow diagram showing steps included in a method for controlling communication of media information in accordance with a first embodiment of the present invention.

FIG. 4 is a flow diagram showing steps included in a method for controlling communication of media information in accordance with a first embodiment of the present invention. This embodiment combines, or multiplexes, different types of media information in one terminal for transmission to a receiving terminal within a same transmission period. The method begins when the transmitting terminal initiates a call with the receiving terminal. (Block 30). As previously discussed, the call may be initiated through a wireless network, the Internet, or any other type of wired network.

Once a call connection is established, the transmitting terminal combines, or multiplexes, first media information and second media information in an output transmission stream. (Block 31). This media information may be selected by a user, for example, through operation of a terminal keypad in conjunction with a displayed menu. The media information may take any one of a variety of forms, including the following:
  streaming video (either pre-stored or real-time)
  short-time video script (e.g., a MPEG file)
  image (e.g., a JPEG file)
  still animation (e.g., a graphical interchange format—GIF)
  live animation (e.g., a moving GIF)
The types of media information listed above may be combined, or multiplexed, in any order, or this information may be combined based on the transmitting terminal user's knowledge of media information that is pre-stored in the receiving terminal. These features of the invention will be described in greater detail below.

Figure 5:
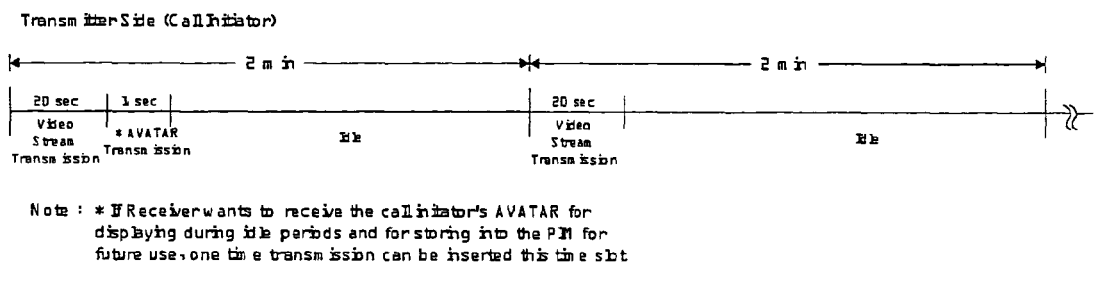
FIG. 5 is a timing diagram showing an example of how the combined/multiplexed media information may be transmitted in accordance with the present invention.

Once the media information has been combined, it is transmitted in tandem or multiplexed form to the receiving terminal preferably with voice information. (Block 32). FIG. 5 is a timing diagram showing an example of how the combined/multiplexed media information may be transmitted in accordance with the present invention. (For convenience purposes, transmission of the voice information has been omitted in this drawing).

FIG. 5 shows that transmission of media information may take place in successive periods, which in this case equals two minutes each. During the first period, a video stream is transmitted with animation information known as an avatar. The video stream is transmitted for the first 20 seconds of the period and the animation information is transmitted in a next succeeding second. In this example, the remainder of the first period is left idle, which means that the transmitting terminal does not transmit any media information although it may very well be continuously transmitting and receiving voice information. Media information transmitted from the receiving terminal may also be received in the transmitting terminal during this time. In a next period, different media information may be transmitted. For example, in the next period only 20 seconds of streaming video may be transmitted. The remainder of the period may then be left idle.

Returning to FIG. 4, in a subsequent step of the method, the receiving terminal controls the manner in which the media information is output on its display. (Block 33). This control may be performed in a variety of ways.

First, a user of the receiving terminal may select a service option instructing a wireless carrier to limit or expand the media services that can be received. For example, receiving high-bandwidth transmissions such as streaming video and short-time video scripts may be very costly in terms of a user's subscription fee. To limit costs, the user of the receiving terminal may enter into an agreement with the wireless carrier to ensure that only lower-bandwidth media is displayed on the receiving terminal. This may be performed, for example, by controller at a switching station which blocks or otherwise filters out higher-bandwidth media before it is arrives at the receiving terminal.

Second, the operating software of the receiving terminal may be configured to block display of higher-bandwidth media, even though it may have been sent by the transmitting terminal. If cost is not a consideration, the receiving terminal may be configured to receive the higher-bandwidth information or only a certain type of media information. The present invention, thus, advantageously allows users to customize their terminals for purposes of displaying multimedia information.

Third, the operating software of the receiving terminal may be programmed to replace received media information with alternative media information stored in a terminal memory. For example, an avatar received by the receiving terminal may not be displayed. Instead, this avatar may be replaced with another avatar stored in the terminal memory. This feature of the invention is particularly desirable for purposes of customizing operation of the terminal to each specific user.

While the invention has been described as storing media information in a terminal memory, those skilled in the art can appreciate that the terminal may also be interfaced to an external memory which stores and retrieves media information in accordance with the present invention.

Figure 6:
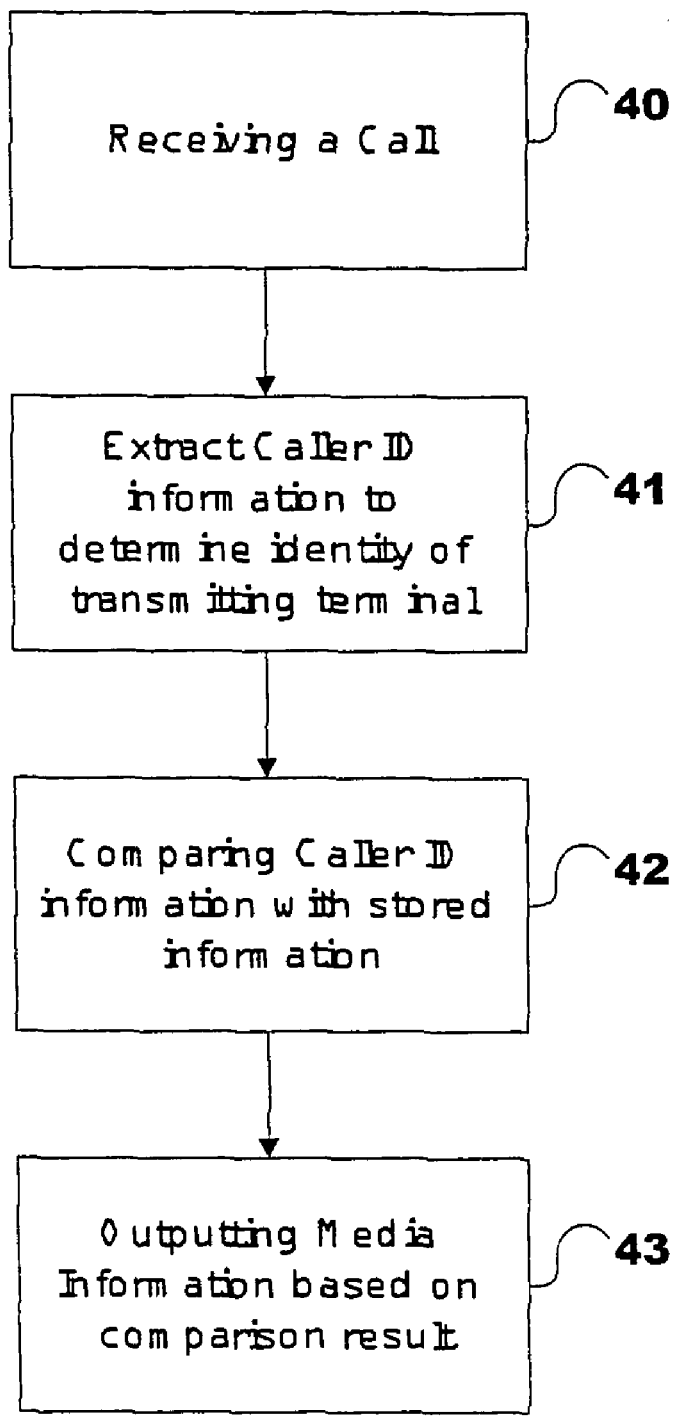
FIG. 6 is a flow diagram showing steps included in a method of the present invention for controlling the manner in which media information is displayed based on the person who sent the information.

In accordance with another embodiment, the method of the present invention controls the manner in which media information is displayed based on the person who sent the information. Referring to FIG. 6, this method begins by receiving a call in a first terminal. (Block 40). Once a call connection has been established, a second step of the method includes extracting and processing caller identification information in the receiving terminal to determine the identity of the transmitting terminal and therefore of a user who likely placed the call. (Block 41). The extracted information may include any one or more of the telephone number of the second terminal, the name of the owner of the terminal, his or her address, etc. If the terminal is connected to the internet, this caller ID information may be comparable information such as a website address.

A third step includes comparing the caller ID information (e.g., caller's telephone number) with information stored in a memory of the first terminal. (Block 42). The stored information may include media information which has been pre-stored in association with the telephone number of the transmitting terminal. The media information may be any of the types previously mentioned, and may even correspond to a characteristic of a user of the transmitting terminal. Alternatively, the media information may be transmitted to the receiving terminal and stored in memory in association with the transmitting terminal's caller ID information for later retrieval.

In accordance with one particularly advantageous feature of the invention, the pre-stored media information may be an avatar which is related to a characteristic of the user of the transmitting terminal. In the graphics world, an avatar is understood to be an animated icon, symbol, or character which may be used, for example, to represent some characteristic or trait of a person. This characteristic may be a physical attribute of the person or may relate to some non-physical feature. Examples of non-physical features include a relationship one user may have with another and a user's occupation. The avatar may also be based on one user's opinion of the other formulated, for example, based on prior knowledge and experience.

A fourth step of the method includes outputting the stored media information on the receiving terminal based on the identity of the transmitting terminal. (Block 43). This involves retrieving the stored media information and the displaying it for a predetermined period of time. If the media information is a video script, for example, the script may be played until its conclusion. Alternatively, if the media information is an avatar, it may be displayed intermittently or even constantly throughout the call.

In an optional but desirable step, an avatar representing a characteristic of the user of the transmitting terminal is displayed before the call is answered by a user of the receiving terminal. This may be accomplished as follows.

When a call is received, an audible tone may sound to inform a user of the receiving terminal of the incoming call. As previously discussed, the call may include information which identifies the transmitting party or his terminal, for example, based on a telephone number or website address. When this information received, a processor of the first terminal may search a memory to locate an avatar which corresponds to the telephone number. This avatar may then be automatically displayed (in lieu of, for example, the transmitting terminal's telephone number). The receiving terminal user may then instantly recognize who the calling party is. For example, if the wife of a receiving terminal user is calling, an avatar in the shape of a heart with her image may be displayed.

In another case, if an avatar indicative of an undesirable person is displayed, the receiving terminal user has the option of not answering the call.

Another optional step is to allow the user to answer the call, but then continue to display the avatar identifying the transmitting terminal user either intermittently or continuously throughout the call. For example, if the only media information to be displayed during the call is a heart-shaped avatar with her image, then this avatar may be displayed until conclusion of the call. On the other hand, if streaming video or image information is to be displayed, then the avatar may be replaced by this additional media information. If desired, the avatar may then be redisplayed after the additional media information concludes to provide continuous visual communication effects.

Figure 7:
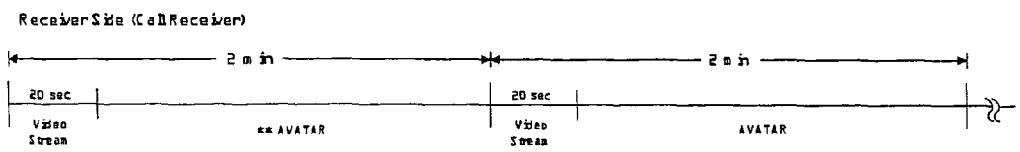
FIG. 7 is timing diagram showing how an optional step of the method of the present invention may be performed.

FIG. 7 is a timing diagram showing how this optional step of the invention may be performed. In this timing diagram, the receiving terminal receives 20 seconds of video streaming data. After this data concludes, an avatar representing a characteristic of the transmitting terminal user may be displayed. As previously discussed, this avatar may be pre-stored in a memory of the receiving terminal, or it may have been transmitted from the transmitting terminal and then stored in the receiving terminal memory for subsequent display. Whenever the receiving terminal displays the stored avatar image, it is not necessary to allocate communication resources.

Figure 8:
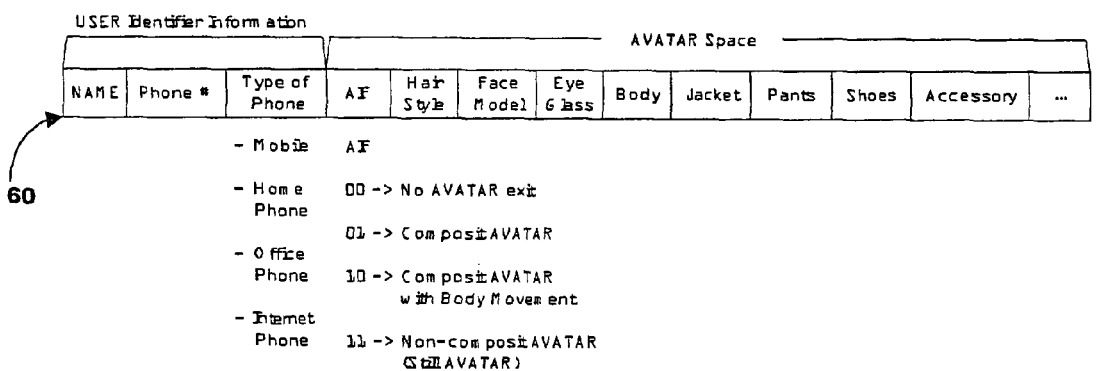
FIG. 8 is a diagram showing an example of a table entry which may be stored in a memory of a receiving terminal for controlling the display of media information in accordance with the present invention.

FIG. 8 shows an example of a table entry which may be stored in a memory of the receiving terminal for controlling the display of media information in accordance with the present invention. This table entry may be a data structure derived from a personal information management (PIM) database located within or interfaced to the receiving terminal. The data structure preferably includes a user identification field 50 and media information identification field 60. The user identification field may include information identifying a user (and/or his terminal) who either has called or may be expected to call the receiving terminal. The information includes the name of a transmitting terminal user, his or her telephone number, and the type of terminal (e.g., mobile phone, home phone, or office phone) corresponding to the telephone number. If the user has an internet phone, the phone number field may be replaced by a website address, otherwise known as a Universal Resource Locator (URL).

The media information identification field is stored in association with the user identification information and may include, for example, an address in either the same or an external memory in which the media information is stored. This situation may arise, for example, when the media information is an image file or video clip. Alternatively, or additionally, the media information identification field may contain information defining one or more attributes of an avatar which corresponds to the transmitting terminal user. If the avatar resembles a physical likeness of this user, the following sub-fields may be included: hair style, face model, eye glasses, body, jacket, pants, shoes, accessories, etc. A processor of the receiving terminal may use graphics generation software to generate the avatar for display based on the information in these fields.

The media information identification field may also include an animator indicator sub-field (AIF) which includes a plurality of bits describing the avatar. For example, a two-bit AIF field may indicate the following:

```
0 0  No avatar exists for the particular telephone number
0 1  Composite avatar
1 0  Composite avatar with gestures and body movement
1 1  Non-composite avatar which can be accessed by the special address
     field.
```

In operation, the receiving terminal processor may access the AIF field and generate the avatar accordingly.

The media information identification field may also include a code for instructing the receiving terminal processor to activate audio (e.g., a bell) or other visual effects. Currently existing mobile terminals typically have more than 1 megabits of memory space which can be used to store this code along with a plurality of table entries for controlling the display of media information on the receiving terminal.

The table entries of the present invention may be updated, modified, or otherwise maintained by connecting the receiving terminal to an external computing system (e.g., a personal computer) via a data port, which, for example, may be a universal serial bus (USB) port. This external system may be loaded with software which allows it to generate custom-designed avatars for each transmitting terminal user identified in the table. The avatars may be two- or three-dimensional representations of these users, if desired.

The memory storing the table entries of the present invention may also store a plurality of default or factory-preset avatars which may be selected to correspond to different users. The operating software of the receiving terminal may be written to allow these avatars to be switched, modified, or deleted either automatically or in response to a receiving terminal user's command. Avatars may be switched for display based on the telephone number from which the transmitting terminal user is calling. For example, as shown in FIG. 8, one user may have multiple telephone numbers. In this case, a different avatar may be displayed based on the telephone number from which the user is calling.

Figure 9:
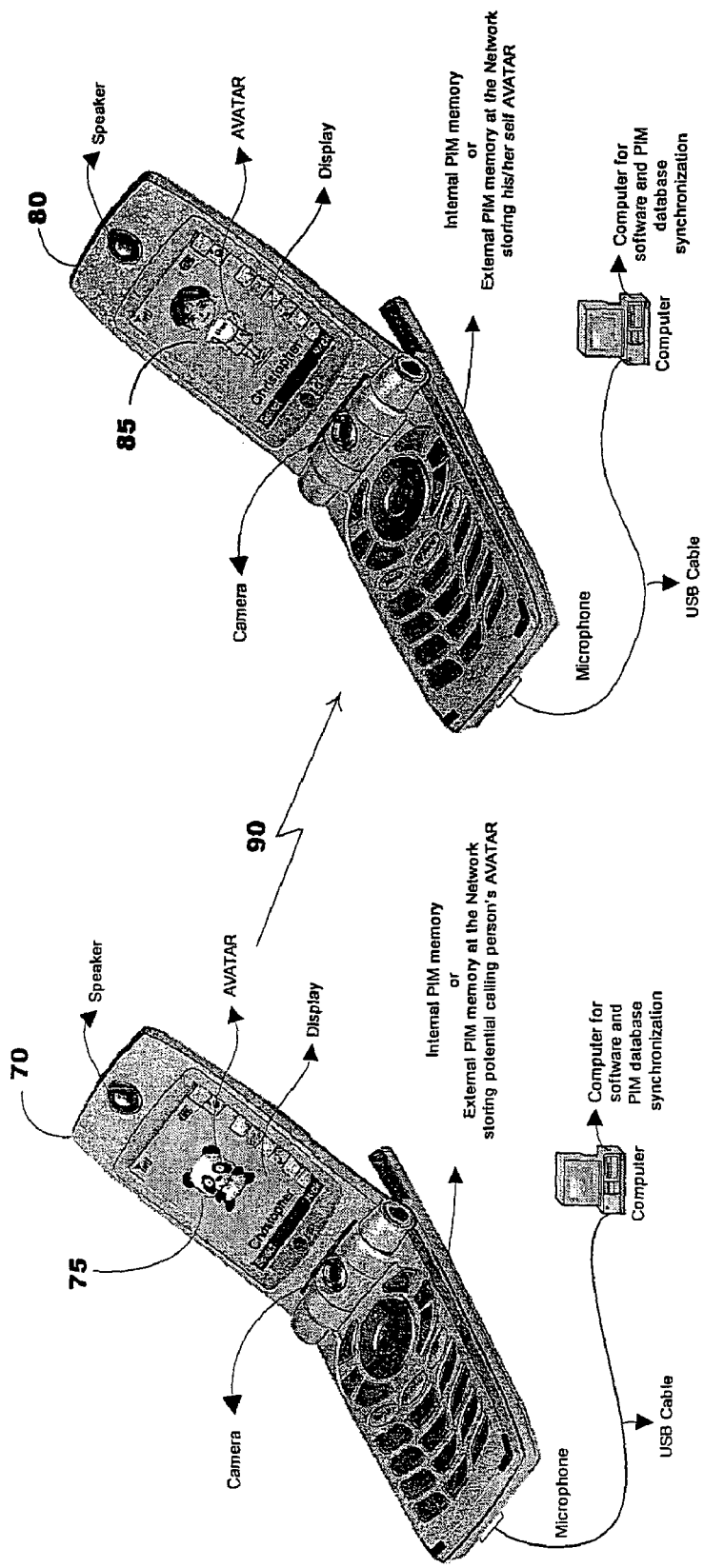
FIG. 9 is a diagram showing how the display of media information may be controlled on two terminals that communicate in accordance with the present invention.

FIG. 9 shows one way in which communications may take place between two mobile terminals 70 and 80 in accordance with the present invention. In this figure, terminal 70 initiated a call to terminal 80 through a wireless network 90. When the terminal 80 receives the call, its processor determines the identity of caller and then displays an avatar 85 in the shape of a man which bears the likeness of caller who's name is Christopher. This avatar may have been transmitted to terminal 80 through the network or may have been created by the receiving terminal user based on his/her experience and knowledge about the caller and pre-stored in a memory of this terminal.

Terminal 70 also displays an avatar 75, representing his/her own desired avatar image. This avatar may be created by the transmitter terminal user to portray him/herself. It may display in his/her terminal as a default image when the terminal is on or may be transmitted over the network to the receiver terminal as one of optional visual communication. In the example shown, avatar 75 corresponds to a panda bear which affectionately was selected to correspond to caller, Christopher's desired representative image. At the receiver terminal, the avatar 85 corresponding to caller Christopher may not be the same avatar 75 of the caller display. If desired, avatars 75 and 85 may be displayed throughout the call session.

To make the conversation more animated, one terminal transmit a control signal to the other terminal during the call to change an attribute of an avatar, or to replace the avatar displayed on the receiving terminal with one either transmitted from the transmitting terminal or pre-stored in the receiving terminal. A control signal of this type may, for example, cause the avatar on the receiving terminal to display an emotion (crying, laughing, etc.) to coincide with a mood or feeling of the transmitting terminal user. This may be implemented, for example, by including a mood sub-field in the table entry of FIG. 8. This sub-field may be a two-bit field for controlling the emotion on the face of the avatar. Updating this field will cause the processor to automatically change the avatar in a corresponding manner.

As previously discussed, the table in a terminal memory may include multiple entries for the same user. This may occur, for example, when the user has multiple phone numbers. In this case, the same avatar may be displayed for all phone numbers corresponding to that user or different avatars may be displayed, for example, depending on the number where the user is calling from. Also, the receiving terminal may be equipped with image-capture software that will allow a single frame (or image) from a received video stream to be stored and subsequently displayed.

The present invention outperforms conventional media communications management systems in terms of performance and convenience to the user. For example, the invention controls the communication of media information between terminals using fewer network resources than are conventionally required. These resources (which include transmission bandwidth) are reduced by allowing a memory of the receiving terminal to store media information that conventional systems must necessarily transmit over the network. This memory may be located within the receiver or externally connected to it.

The present invention allows users to control the types of media services that they would like to receive, thereby allowing the users to control costs and the extent of media services to be received.

The present invention also allows users to combine, or multiplex, different types of media information having different transmission bandwidth requirements within a single transmission period, thereby enhancing the content of conversations between users for both personal and business applications.

With the foregoing in mind, the present invention may be used to implement at least the following communications scenarios.

Visual Message Initiator transmitter) with
Real-Time, Two-Way Video Stream Phone
Capability including Voice Conversation Despite of the fact that many terminals today including mobile terminals have the capability to display streaming video, many customers may not want to pay high rates carriers charge for these and other broadband services. The present invention takes this into consideration by giving users the option to control which media services they would like to receive. For example, during a call set-up process, a user of the transmitting terminal may negotiate options for a video stream service with the network. This negotiation process may be performed using an intended visual message transmitter. An appropriate service may then be selected from various service options.

Exemplary service options include:
a) full-bandwidth streaming video service (e.g., MPEG format)
b) short-time streaming video service (e.g., MPEG format)
c) Images d) Still animation e) Live Animation If full-bandwidth streaming video is selected, the transmitting terminal may transmit continuous video output from the camera unit in the terminal. This may continue until for the duration of the call or until the user switches this function off.

If the short-time streaming video service is selected, the transmitting terminal may transmit a short-time streaming video script for a predetermined time period (e.g., 20 seconds) over a network. The receiving terminal may capture and then display the video, and in the meantime may store the script in an internal memory or external memory. A user of the receiving terminal may display this script repeatedly from an internal memory without requiring any additional allocation of network resources. In addition, the video script may be refreshed periodically during the call, for example, every 2 minutes.

If the user selects the option for receiving images, images may be transmitted to the receiving terminal once every predetermined time period (e.g., every two minutes).

If the user selects the option for receiving animation, animated information such as, for example, an icon may be transmitted to the receiving terminal, for example, in the manner shown in the timing diagrams of FIG. 5 or 7. As previously discussed, this icon may be an avatar created, for example, by the transmitting party in the form of a character, symbol, or other graphical representation of him or herself. The avatar may be created by software stored inside the transmitting terminal, or may be downloaded from external software tools allowing the user to create his own avatar. Those skilled in the art can appreciate that a physical resemblance is not necessary, as the avatar may correspond to any desired graphic of the transmitting user's choosing. A system capable of generating an avatar of this type is disclosed in U.S. Pat. No. 6,384,829, the contents of which are incorporated herein by reference.

In addition to still avatars, the animated information transmitted in accordance with the present invention may be live animation or a moving avatar, one type of which is known as an animated GIF. When the avatar resembles a character of some sort, its movement may cause the avatar to appear to be speaking, moving forward and backward, laughing, crying, eyes closing and opening, hand pointing, and etc. While in this example the transmitting party is identified as creating and transmitting the avatar to the receiving party, those skilled in the art can appreciate that the avatar may be stored in and subsequently displayed on the receiving terminal. In this case, the avatar may be automatically displayed based on recognition of caller ID information by the receiving terminal, displayed in response to a control signal transmitted from the transmitting terminal to the receiving terminal, displayed based on control information input by the receiving party himself, or at any other time during the call session.

When displayed in response to a control signal from the transmitting terminal, the control signal may cause different avatars to be displayed on the receiving terminal, for example, to commemorate an event (e.g., a happy birthday GIF) or to resemble an emotion or mood the transmitting party is feeling (e.g., a GIF resembling the transmitting part with a happy face).

When displayed based on control information input the user, the avatar sent by the transmitting user may be ignored and replaced with an avatar of the receiving user's choosing. For example, if the receiving terminal user does not like the transmitting terminal user, the receiving terminal may, based on previously stored settings, cause an avatar of a dog to be displayed in response to the detection of caller ID information. If desired, this avatar may be displayed even when the transmitting party transmits no avatar to the receiving terminal.

If no media service is selected, no media information may be displayed. In this case, no extra bandwidth is allocated for visual communications between the transmitting and receiving terminals. All these options include a simultaneous and continuous two-way voice conversation. At the receiving terminal, a default avatar stored in the receiving terminal or a avatar which corresponds to the caller id may be displayed.

In this exemplary embodiment of the invention, the transmitting terminal user (or call initiator) may select one of the aforementioned service options or any combination of these options to control the display of media information during a call session. This selection may be based on his or her desire and willingness to pay for the service desired. Generally speaking, the higher the bandwidth requirement, the more expensive the service option. Thus, live streaming video may be expected to be the most expensive and still animation the least expensive.

FIG. 7, which has been previously discussed, shows an exemplary scenario. To reiterate, in this scenario the call initiator sends a 20-second short-time stream video every 2 minutes. During the first 2-minute period, the call initiator sends his avatar just one time if the receiving party indicates that he want to receive the call initiator's avatar or if the transmitting party is not sure whether the receiving terminal user has the call initiator's avatar stored in a memory of the receiving terminal.

After the receiving terminal receives the transmitted avatar, the receiving terminal may store the avatar in a receiver-accessible memory, which may be internal or external memory. The receiving terminal can then subsequently display the avatar at the user's discretion.

In another scenario, the call initiator does not transmit any media information. In this case, the receiving terminal user may display an avatar created and/or selected by this user to represent the caller. This avatar may be stored in the receiving terminal's memory and recalled as previously discussed. Because the avatar was pre-stored in the receiver terminal, no extra bandwidth allocation is required to display this avatar and thus network resources are conserved.

Real-Time, Two-Way Video Stream Phone Communications Including Voice Conversation for the Call Receiver During a call set-up process, the network may indicate that there is a particular service option request from the call initiator. The service options at the receiver side can be same as for the transmitter side. Alternatively, one of the terminals may have a different service option setting than the other, to reflect that user's preference for either cost savings or enhanced media services. In this example, the service options are the same as in the first example.

At the receiver, the service option request sent from the transmitting terminal is checked against the receiver's parameter settings. These settings may indicate the current software and hardware versions of the receiving terminal, and the willingness of a receiving terminal user to share the cost of communicating or receiving media services indicated in the service option request. If the requested services are acceptable to the receiving terminal user, the transmitting terminal user (or call initiator) transmits the media information to the receiving terminal in accordance with the service options mentioned in the request.

For the avatar option, the receiving terminal does not need to receive any information from the call initiator if the avatar of the call initiator has already been generated and stored in the receiver terminal's memory or PIM database. In this case, the receiving terminal fetches and then displays the particular avatar from the memory or PIM database based on the caller initiator's phone number (Caller ID). This feature of the invention is advantageous because it allows media information to be displayed on the receiver terminal without using any bandwidth resources of the network.

The system and method of the present invention may include a number of additional features. For example, the invention may communicate media information with voice communications (e.g., video teleconferencing, video telephone applications, etc) or without voice communications (e.g., real-time, instant messaging system, etc.). This may be accomplished, for example, by transmitting voice signals over a circuit-switched logical channel and the media information over one or more packet-switched logical channels. Those skilled in the art can appreciate that other known methods may also be used.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for reducing bandwidth in a communications network, the method comprising:
   pre-storing a virtual image in a receiving party terminal that is created entirely by the receiving party based on at least one of the receiving party's prior knowledge of a calling party or the receiving party's own perception of the calling party;
   displaying the virtual image on the receiving party terminal when a call is received from a terminal of the calling party; and
   selecting at least one format for transmitting media information from the calling party terminal,
   wherein the receiving party unilaterally changes the selected format for transmitting the media information.

2. The method of claim 1, further comprising determining an identity of the calling party when the call is received, and retrieving the pre-stored virtual image in response to the determined identity.

3. The method of claim 2, wherein said determining is performed based on caller identification information associated with the call.

4. The method of claim 1, wherein said displaying step further comprises displaying the virtual image on the receiving party terminal during an idle period when no media information is received from the calling party terminal.

5. The method of claim 1, wherein said displaying step further comprises displaying the virtual image on the receiving party terminal during a period when only voice information is received from the calling party terminal.

6. The method of claim 1, wherein the selected at least one format for transmitting the media information comprises at least one of the following:
   (a) streaming video,
   (b) short-time video script,
   (c) a still image, and
   (d) a virtual image created by the calling party.

7. The method of claim 1, wherein an identification of the selected at least one format for transmitting the media information is stored in association with calling party identification information, and unilaterally determined at the receiving party terminal.

8. The method of claim 6, wherein the virtual image created by the calling party comprises an avatar.

9. The method of claim 7, wherein the identification is provided to the calling party and the receiving party.

* * * * *